(12) United States Patent
Hiraishi

(10) Patent No.: US 12,006,218 B2
(45) Date of Patent: Jun. 11, 2024

(54) METHOD FOR PRODUCING SEMICONDUCTING SINGLE-WALLED CARBON NANOTUBE DISPERSION

(71) Applicant: KAO CORPORATION, Tokyo (JP)

(72) Inventor: Atsushi Hiraishi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 163 days.

(21) Appl. No.: 17/776,738

(22) PCT Filed: Nov. 13, 2020

(86) PCT No.: PCT/JP2020/042500
§ 371 (c)(1),
(2) Date: May 13, 2022

(87) PCT Pub. No.: WO2021/095870
PCT Pub. Date: May 20, 2021

(65) Prior Publication Data
US 2022/0402761 A1 Dec. 22, 2022

(30) Foreign Application Priority Data

Nov. 15, 2019 (JP) ................................ 2019-207405

(51) Int. Cl.
| | | |
|---|---|---|
| C01B 32/159 | (2017.01) | |
| B01D 21/26 | (2006.01) | |
| B01D 37/00 | (2006.01) | |
| C01B 32/172 | (2017.01) | |
| C01B 32/174 | (2017.01) | |
| C08F 220/06 | (2006.01) | |
| C08F 220/68 | (2006.01) | |
| C09D 11/037 | (2014.01) | |
| C09D 11/50 | (2014.01) | |
| C09K 23/36 | (2022.01) | |

(52) U.S. Cl.
CPC .......... *C01B 32/159* (2017.08); *B01D 21/262* (2013.01); *B01D 37/00* (2013.01); *C01B 32/172* (2017.08); *C01B 32/174* (2017.08); *C08F 220/06* (2013.01); *C08F 220/68* (2013.01); *C09D 11/037* (2013.01); *C09D 11/50* (2013.01); *C09K 23/36* (2022.01); *C01B 2202/02* (2013.01); *C01B 2202/22* (2013.01); *C01B 2202/36* (2013.01); *C08F 2800/10* (2013.01); *C08F 2800/20* (2013.01)

(58) Field of Classification Search
CPC ... C01B 32/159; C01B 32/172; C01B 32/174; C01B 2202/02; C01B 2202/22; C01B 2202/36; B01D 21/262; B01D 37/00; C08F 220/06; C08F 220/68; C08F 2800/10; C08F 2800/20; C09D 11/037; C09D 11/50; C09D 11/324; C09D 11/107; C09D 11/52; C09D 11/03; C09D 11/10; C09K 23/36
See application file for complete search history.

(56) References Cited

U.S. PATENT DOCUMENTS

| | | |
|---|---|---|
| 7,074,310 B2 | 7/2006 | Smalley et al. |
| 10,037,832 B2 * | 7/2018 | Hersam ................. C01B 32/172 |
| 10,676,360 B2 * | 6/2020 | Reis ..................... H10K 85/221 |
| 2004/0041154 A1 | 3/2004 | Watanabe et al. |
| 2011/0280791 A1 | 11/2011 | Tanaka et al. |
| 2013/0180897 A1 | 7/2013 | Tanaka et al. |
| 2016/0035457 A1 | 2/2016 | Murase et al. |

(Continued)

FOREIGN PATENT DOCUMENTS

| | | |
|---|---|---|
| CN | 1480981 A | 3/2004 |
| CN | 105190901 A | 12/2015 |

(Continued)

OTHER PUBLICATIONS

U.S. Appl. No. 17/776,813, filed May 13, 2022.

(Continued)

*Primary Examiner* — Mark Kopec
*Assistant Examiner* — Jaison P Thomas
(74) *Attorney, Agent, or Firm* — Birch, Stewart, Kolasch & Birch, LLP

(57) ABSTRACT

In one aspect, provided is a method for producing a semiconducting single-walled carbon nanotube dispersion. This method allows semiconducting single-walled carbon nanotubes to be separated from a single-walled carbon nanotube mixture containing semiconducting single-walled carbon nanotubes and metallic single-walled carbon nanotubes in an aqueous medium, and yet requires only an easily available separation agent and a simple operation.

One aspect of the present disclosure relates to a method for producing a semiconducting single-walled carbon nanotube dispersion. The method includes (A) preparing a single-walled carbon nanotube dispersion to be separated that contains single-walled carbon nanotubes composed of semiconducting single-walled carbon nanotubes and metallic single-walled carbon nanotubes, an aqueous medium, and a copolymer containing a constitutional unit A derived from a monomer represented by the following formula (1) and a constitutional unit B derived from a monomer represented by the following formula (3), and (B) centrifuging the single-walled carbon nanotube dispersion to be separated and then collecting a supernatant containing the semiconducting single-walled carbon nanotubes from the centrifuged single-walled carbon nanotube dispersion $$CH_2\!=\!CH\!-\!COOM \quad (1)$$

$$CH_2\!=\!CR^5\!-\!COO\!-\!(CH_2CH_2O)_q\!-\!H \quad (3).$$

17 Claims, No Drawings

(56) References Cited

U.S. PATENT DOCUMENTS

| | | | |
|---|---|---|---|
| 2016/0137505 A1 | 5/2016 | Nakashima et al. | |
| 2016/0340521 A1 | 11/2016 | Yoshiwara et al. | |
| 2017/0335185 A1 | 11/2017 | Iizumi et al. | |
| 2018/0226650 A1* | 8/2018 | Yoo | H01M 4/364 |
| 2018/0331293 A1 | 11/2018 | Hayashida et al. | |
| 2019/0119508 A1 | 4/2019 | Okamoto et al. | |
| 2020/0047122 A1 | 2/2020 | Nihey et al. | |
| 2020/0223695 A1* | 7/2020 | Ihara | C01B 32/159 |
| 2021/0188642 A1* | 6/2021 | Hiraishi | C01B 32/159 |
| 2022/0388848 A1* | 12/2022 | Asai | C09D 11/324 |
| 2023/0212343 A1* | 7/2023 | Shimanaka | C09C 1/44 |
| | | | 252/511 |

FOREIGN PATENT DOCUMENTS

| | | |
|---|---|---|
| CN | 106315559 A | 1/2017 |
| CN | 106414320 A | 2/2017 |
| CN | 107614427 A | 1/2018 |
| CN | 108878652 A | 11/2018 |
| CN | 108883937 A | 11/2018 |
| EP | 1 483 202 B1 | 12/2012 |
| JP | 2005-527455 A | 9/2005 |
| JP | 2007-519594 A | 7/2007 |
| JP | 2008-55375 A | 3/2008 |
| JP | 2010-1162 A | 1/2010 |
| JP | 2010-64904 A | 3/2010 |
| JP | 2011-162410 A | 8/2011 |
| JP | 2012-36041 A | 2/2012 |
| JP | 2014-503445 A | 2/2014 |
| JP | 2019-202912 A | 11/2019 |
| TW | 201107373 A1 | 3/2011 |
| WO | WO 03/084869 A2 | 10/2003 |
| WO | WO 2005/069789 A2 | 8/2005 |
| WO | WO 2012/060601 A2 | 5/2012 |
| WO | WO 2014/136981 A1 | 9/2014 |
| WO | WO 2015/130229 A1 | 9/2015 |
| WO | WO 2018/158811 A1 | 9/2018 |
| WO | WO 2019/064597 A1 | 4/2019 |

OTHER PUBLICATIONS

International Search Report for PCT/JP2020/042500 mailed on Jan. 26, 2021.

Cui et al., "New iso-indigo-based conjugated polymer useful in semiconductor carbon nanotube (CNT) ink for manufacturing semiconductor device," WPI/2017 Clarivate Analytics, 2017, XP002806598, 3 pages total.

Extended European Search Report for European Application No. 20886409.0, dated Oct. 19, 2023.

Extended European Search Report for European Application No. 20887985.8, dated Dec. 11, 2023.

Homenick et al., "High-Yield, Single-Step Separation of Metallic and Semiconducting SWCNTs Using Block Copolymers at Low Temperatures," Journal of Physical Chemistry, vol. 118, 2014, pp. 16156-16164.

* cited by examiner

METHOD FOR PRODUCING SEMICONDUCTING SINGLE-WALLED CARBON NANOTUBE DISPERSION

TECHNICAL FIELD

The present disclosure relates to a method for producing a semiconducting single-walled carbon nanotube dispersion, a method for producing semiconducting single-walled carbon nanotubes, which includes the above production method as a process, and a method for separating semiconducting single-walled carbon nanotubes from metallic single-walled carbon nanotubes.

BACKGROUND ART

In recent years, nanometer-sized carbon materials are expected to be applied in various fields due to their physical and chemical properties. Carbon nanotubes (also referred to as "CNTs" in the following) are one of those materials. CNTs are composed of a sheet or sheets of graphene rolled into a cylindrical shape If the CNTs consist of a single layer, they are called single-walled carbon nanotubes (also referred to as "SWCNTs" in the following).

CNTs are known to have different electrical properties depending on how the graphene sheet is rolled, the diameter, or the like. In particular, SWCNTs are significantly affected by the quantum effect, and thus can exhibit metallic behavior (metallic CNTs) or semiconducting behavior (semiconducting CNTs). SWCNTs may be produced by a known synthesis method such as a high-pressure carbon monoxide disproportionation method (HiPco method), an enhanced direct injection pyrolytic synthesis method (e-DIPS method), an arc discharge method, or a laser ablation method. However, at present, a technology for producing either one of the two types of CNTs has not been established yet. When SWCNTs are used for various applications, only the desired type of SWCNTs needs to be separated from the mixture of SWCNTs. The metallic CNTs have excellent electrical conductivity and show potential for application in, e.g., transparent electrodes for touch panels or solar cells and fine wiring of devices. The semiconducting CNTs show potential for application in, e.g., transistors and sensors.

Several methods for separating semiconducting SWCNTs from metallic SWCNTs have been reported. For example, JP 2010-1162 A discloses a density gradient centrifugation method in which SWCNTs are dispersed with a surfactant such as sodium dodecyl sulfate or sodium cholate, mixed with a density gradient agent, and subjected to centrifugal separation JP 2008-55375 A discloses an electric field separation method in which SWCNTs are dispersed with a surfactant and separated under an applied electric field. JP 2007-519594 A discloses a method in which SWCNTs are mixed with a separation agent such as porphyrin in an organic solvent to form a complex of semiconducting SWCNTs and the separation agent, and the complex is extracted. JP 2014-503445 A discloses a method in which SWCNTs are mixed with a separation agent such as a polythiophene derivative in an organic solvent, and the interaction between semiconducting SWCNTs and the separation agent is used to selectively separate the semiconducting SWCNTs. JP WO 2014/136981 A1 discloses a method in which SWCNTs are mixed with a separation agent such as a flavin derivative in an organic solvent, and the adsorption of the separation agent to semiconducting SWCNTs is used to separate the semiconducting SWCNTs. JP 2012-36041 A discloses a method in which SWCNTs are dispersed with a surfactant and placed in a separation vessel filled with a separation material such as agar gel, and semiconducting SWCNTs that are adsorbed to the separation material are eluted from the separation material by using an eluant. JP WO 2019/064597 A1 discloses a method in which a dispersion containing a surfactant such as polyoxyethylene (100) stearyl ether and a SWCNT mixture is prepared and subjected to an ultrasonic dispersion treatment and ultracentrifugation, and a voltage is applied to the resulting supernatant so that the SWCNT mixture is separated into metallic SWCNTs and semiconducting SWCNTs.

DISCLOSURE OF INVENTION

One aspect of the present disclosure relates to a method for producing a semiconducting single-walled carbon nanotube dispersion (also referred to as a "semiconducting SWCNT dispersion" in the following). The method includes (A) preparing a single-walled carbon nanotube dispersion to be separated (also referred to as a "SWCNT dispersion to be separated" in the following) that contains single-walled carbon nanotubes composed of semiconducting single-walled carbon nanotubes (also referred to as "semiconducting SWCNTs" in the following) and metallic single-walled carbon nanotubes (also referred to as "metallic SWCNTs" in the following), an aqueous medium, and a copolymer containing a constitutional unit A derived from a monomer represented by the following formula (1) and a constitutional unit B derived from a monomer represented by the following formula (3), and (B) centrifuging the SWCNT dispersion to be separated and then collecting a supernatant containing the semiconducting SWCNTs from the centrifuged SWCNT dispersion.

$$CH_2=CH-COOM \qquad (1)$$

where M represents a hydrogen atom, a metal atom, or a group with a structure represented by the following formula (2):

[Chemical Formula 1]

$$\begin{array}{c} R^4 \\ | \\ R^1-N-R^2 \\ | \\ R^3 \end{array} \qquad (2)$$

where $R^1$, $R^2$, $R^3$, and $R^4$ each independently represent a hydrogen atom or an alkyl group having 1 to 2 carbon atoms and optionally containing a hydroxyl group.

$$CH_2=CR^5-COO-(CH_2CH_2O)_q-H \qquad (3)$$

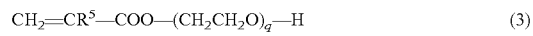

where $R^5$ represents a hydrogen atom or a methyl group, and q represents an average number of moles of an ethyleneoxy group added and is 2 to 120.

One aspect of the present disclosure relates to a method for producing semiconducting SWCNTs. The method includes filtering the semiconducting SWCNT dispersion obtained by the method for producing a semiconducting SWCNT dispersion of the present disclosure and collecting the semiconducting SWCNTs.

One aspect of the present disclosure relates to a method for producing semiconducting SWCNTs. The method includes drying the semiconducting SWCNT dispersion obtained by the method for producing a semiconducting SWCNT dispersion of the present disclosure to give a mixture containing the semiconducting SWCNTs and the copolymer, and removing the copolymer from the mixture and collecting the semiconducting SWCNTs.

One aspect of the present disclosure relates to a method for producing semiconducting SWCNTs. The method includes obtaining the semiconducting SWCNTs without performing a further separation treatment of the semiconducting SWCNT dispersion obtained by the method for producing a semiconducting SWCNT dispersion of the present disclosure.

One aspect of the present disclosure relates to a method for separating semiconducting SWCNTs from metallic SWCNTs. The method includes (A) preparing a SWCNT dispersion to be separated that contains single-walled carbon nanotubes composed of semiconducting SWCNTs and metallic SWCNTs, an aqueous medium, and a copolymer containing a constitutional unit A derived from a monomer represented by the following formula (1) and a constitutional unit B derived from a monomer represented by the following formula (3), and (B) centrifuging the SWCNT dispersion to be separated and then collecting a supernatant containing the semiconducting SWCNTs from the centrifuged SWCNT dispersion.

$$CH_2=CH-COOM \quad (1)$$

where M represents a hydrogen atom, a metal atom, or a group with a structure represented by the following formula (2):

[Chemical Formula 2]

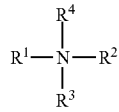
(2)

where $R^1$, $R^2$, $R^3$, and $R^4$ each independently represent a hydrogen atom or an alkyl group having 1 to 2 carbon atoms and optionally containing a hydroxyl group.

$$CH_2=CR^5-COO-(CH_2CH_2O)_q-H \quad (3)$$

where $R^5$ represents a hydrogen atom or a methyl group, and q represents an average number of moles of an ethyleneoxy group added and is 2 to 120.

One aspect of the present disclosure relates to a method for producing an ink containing semiconducting SWCNTs. The method includes, as a process, the method for producing a semiconducting SWCNT dispersion of the present disclosure or the method for producing semiconducting SWCNTs of the present disclosure.

One aspect of the present disclosure relates to an ink containing semiconducting SWCNTs. The ink contains semiconducting SWCNTs, at least one selected from the group consisting of an organic solvent and water, and a copolymer containing a constitutional unit A derived from a monomer represented by the following formula (1) and a constitutional unit B derived from a monomer represented by the following formula (3).

$$CH_2=CH-COOM \quad (1)$$

where M represents a hydrogen atom, a metal atom, or a group with a structure represented by the following formula (2):

[Chemical Formula 3]

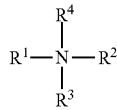
(2)

where $R^1$, $R^2$, $R^3$, and $R^4$ each independently represent a hydrogen atom or an alkyl group having 1 to 2 carbon atoms and optionally containing a hydroxyl group.

$$CH_2=CR^5-COO-(CH_2CH_2O)_q-H \quad (3)$$

where $R^5$ represents a hydrogen atom or a methyl group, and q represents an average number of moles of an ethyleneoxy group added and is 2 to 120.

One aspect of the present disclosure relates to an aqueous dispersion containing semiconducting SWCNTs and a copolymer containing a constitutional unit A derived from a monomer represented by the following formula (1) and a constitutional unit B derived from a monomer represented by the following formula (3).

$$CH_2=CH-COOM \quad (1)$$

where M represents a hydrogen atom, a metal atom, or a group with a structure represented by the following formula (2):

[Chemical Formula 4]

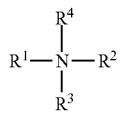
(2)

where $R^1$, $R^2$, $R^3$, and $R^4$ each independently represent a hydrogen atom or an alkyl group having 1 to 2 carbon atoms and optionally containing a hydroxyl group.

$$CH_2=CR^5-COO-(CH_2CH_2O)_q-H \quad (3)$$

where $R^5$ represents a hydrogen atom or a methyl group, and q represents an average number of moles of an ethyleneoxy group added and is 2 to 120.

One aspect of the present disclosure relates to use of a copolymer for separation of semiconducting SWCNTs. The copolymer contains a constitutional unit A derived from a monomer represented by the following formula (1) and a constitutional unit B derived from a monomer represented by the following formula (3).

$$CH_2=CH-COOM \quad (1)$$

where M represents a hydrogen atom, a metal atom, or a group with a structure represented by the following formula (2):

[Chemical Formula 5]

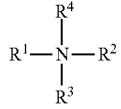
(2)

where $R^1$, $R^2$, $R^3$, and $R^4$ each independently represent a hydrogen atom or an alkyl group having 1 to 2 carbon atoms and optionally containing a hydroxyl group.

$$CH_2=CR^5-COO-(CH_2CH_2O)_q-H \quad (3)$$

where $R^5$ represents a hydrogen atom or a methyl group, and q represents an average number of moles of an ethyleneoxy group added and is 2 to 120.

DESCRIPTION OF THE INVENTION

The separation methods disclosed in JP 2010-1162 A and JP 2012-36041 A require the density gradient agent, the agar get or the like and involve many operation processes. The separation method disclosed in JP 2008-55375 A requires an electrophoresis apparatus, takes time for separation, and yields a low concentration of SWCNTs separated. The separation methods disclosed in JP 2007-519594 A JP 2014-503445 A, and JP WO 2014/136981 A1 are less practical because the separation has to be performed in a nonpolar solvent, and expensive separation agents are required. The separation method disclosed in JP WO 2019/064597 A1 requires the ultrasonic dispersion treatment, the ultracentrifugation, and the voltage application, leading to many operation processes.

The present disclosure provides a method for producing a semiconducting SWCNT dispersion. This method allows semiconducting SWCNTs to be separated from a SWCNT mixture containing semiconducting SWCNTs and metallic SWCNTs in an aqueous medium, and yet requires only an easily available separation agent and a simple operation. The present disclosure also provides a method for producing semiconducting SWCNTs, which includes the above production method as a process. Moreover, the present disclosure provides a method for separating semiconducting SWCNTs from metallic SWCNTs. Further, the present disclosure provides a method for producing an ink containing semiconducting SWCNTs.

The present disclosure is based on the findings that the presence of a specific copolymer in the SWCNT dispersion to be separated makes it possible to separate semiconducting SWCNTs from metallic SWCNTs in the SWCNT dispersion by means of an easily available separation agent and a simple operation.

The present disclosure can provide a method for producing a semiconducting SWCNT dispersion, which uses an easily available separation agent and a simple operation to separate semiconducting SWCNTs from metallic SWCNTs in an aqueous medium and enables good separability of the semiconducting SWCNTs, a method for producing semiconducting SWCNTs, which includes the above production method as a process, a method for separating semiconducting SWCNTs from metallic SWCNTs, and a method for producing an ink containing semiconducting SWCNTs.

The details of the mechanism of the effects of the present disclosure are still not clear, but may be assumed as follows.

In the present disclosure, the SWCNT dispersion to be separated contains the copolymer containing the constitutional unit A derived from the monomer represented by the formula (1) and the constitutional unit B derived from the monomer represented by the formula (3). Since the constitutional unit A has a high affinity for the aqueous medium, the copolymer tends to be easily dispersed in the dispersion. On the other hand, semiconducting SWCNTs and metallic SWCNTs differ from each other in the magnitude of the interaction between the copolymer and the SWCNTs. Such a difference in the magnitude of the interaction may cause a difference in the degree of dispersion between semiconducting SWCNTs and metallic SWCNTs. Consequently, the semiconducting SWCNTs are selectively dispersed in the dispersion, while the metallic SWCNTs are aggregated. Therefore, it is considered that centrifugation of this dispersion may result in a good separation of the semiconducting SWCNTs and the metallic SWCNTs.

However, the present disclosure should not be interpreted solely by the above mechanism.

[Method for Producing Semiconducting SWCNT Dispersion and Method for Separating Semiconducting SWCNT from Metallic SWCNT]

In one aspect, the present disclosure relates to a method for producing a semiconducting SWCNT dispersion (also referred to as a "production method of a dispersion of the present disclosure" in the following). The production method of a dispersion of the present disclosure includes the following process A and process B. In another aspect, the present disclosure relates to a method for separating semiconducting SWCNTs from metallic SWCNTs (also referred to as a "separation method of the present disclosure" in the following). The separation method of the present disclosure includes the following process A and process B.

(Process A) Preparing a SWCNT dispersion to be separated that contains single-walled carbon nanotubes composed of semiconducting SWCNTs and metallic SWCNTs (also referred to as a "SWCNT mixture" in the following), a copolymer containing a constitutional unit A derived from a monomer represented by the following formula (1) (also referred to as a "monomer A" in the following) and a constitutional unit B derived from a monomer represented by the following formula (3) (also referred to as a "monomer B" in the following), and an aqueous medium (Process B) Centrifuging the SWCNT dispersion to be separated and then collecting a supernatant containing the semiconducting SWCNTs from the centrifuged SWCNT dispersion $$CH_2=CH-COOM \quad (1)$$

where M represents a hydrogen atom, a metal atom, or a group with a structure represented by the following formula (2):

[Chemical Formula 6]

$$R^1-\underset{\underset{R^3}{|}}{\overset{\overset{R^4}{|}}{N}}-R^2 \quad (2)$$

where $R^1$, $R^2$, $R^3$, and $R^4$ each independently represent a hydrogen atom or an alkyl group having 1 to 2 carbon atoms and optionally containing a hydroxyl group, and N represents $N^+$.

$$CH_2=CR^5-COO-(CH_2CH_2O)_q-H \quad (3)$$

where $R^5$ represents a hydrogen atom or a methyl group, and q represents an average number of moles of an ethyleneoxy group added and is 2 to 120.

In the present disclosure, "collecting a supernatant containing the semiconducting SWCNTs" means collecting the supernatant that has a higher proportion of the semiconducting SWCNTs with respect to the ratio of the semiconducting SWCNTs to the metallic SWCNTs in the SWCNT dispersion to be separated, which has been prepared in the process A This supernatant corresponds to the semiconducting SWCNT dispersion. The present disclosure does not exclude the case where the supernatant contains a relatively small amount of the metallic SWCNTs, compared to the amount of the semiconducting SWCNTs. The improvement in separability of the semiconducting SWCNTs increases the proportion of the semiconducting SWCNTs in the SWCNTs contained in the supernatant, and thus makes the semiconducting SWCNT dispersion more useful as a material for semiconductor devices.

In the process B, the supernatant may be collected, e.g., by separating the supernatant from the residue. The residue contains a precipitate that contains a relatively large amount of the metallic SWCNTs, compared to the amount of the semiconducting SWCNTs.

[Process A]

In the process A of the production method of a dispersion of the present disclosure and the separation method of the present disclosure, in one or more embodiments, the SWCNT dispersion to be separated may be obtained by preparing a mixed solution (also referred to as a "mixed solution A" in the following) that contains at least the copolymer containing the constitutional unit A derived from the monomer A and the constitutional unit B derived from the monomer B, the SWCNT mixture, and the aqueous medium, and then subjecting the mixed solution A to a dispersion treatment. The mixed solution A may be prepared, e.g., by adding the SWCNT mixture to an aqueous solution of the copolymer.

[Copolymer Containing Constitutional Unit A Derived from Monomer A and Constitutional Unit B Derived from Monomer B]

The copolymer is preferably water soluble from the viewpoint of improving the separability of the semiconducting SWCNTs. In the present disclosure, the term "water soluble" means that at least 1 g of the copolymer is dissolved in 100 g of water at 20° C. In one or more embodiments, the copolymer may be used to separate the semiconducting SWCNTs. In one aspect, the present disclosure relates the use of the copolymer for separation of the semiconducting SWCNTs. The copolymer contains a constitutional unit A derived from a monomer represented by the formula (1) and a constitutional unit B derived from a monomer represented by the formula (3).

The constitutional unit A contained in the copolymer is a constitutional unit derived from the monomer A represented by the formula (1). In the formula (1), M represents a hydrogen atom, a metal atom, or a group with a structure represented by the formula (2) from the viewpoint of improving the separability and productivity of the semiconducting SWCNTs. M is preferably a hydrogen atom or a group with a structure represented by the formula (2), and more preferably a hydrogen atom from the viewpoint of improving the separability, productivity, and versatility of the semiconducting SWCNTs.

The monomer A may be, e.g., an acrylic acid (AA).

The constitutional unit B contained in the copolymer is a constitutional unit derived from the monomer B represented by the formula (3). In the formula (3), $R^5$ may be either a hydrogen atom or a methyl group. In the formula (3), q is 2 or more, preferably 3 or more, and more preferably 4 or more from the viewpoint of improving the separability of the semiconducting SWCNTs. Furthermore, q is 120 or less, preferably 90 or less, more preferably 45 or less, even more preferably 25 or less, and further preferably 12 or less from the same viewpoint.

The monomer B may be, e.g., polyethylene glycol monoacrylate.

The copolymer may be, e.g., at least one selected from acrylic acid/polyethylene glycol (10) monoacrylate copolymer and acrylic acid/polyethylene glycol (4.5) monoacrylate copolymer. The numerical value in parentheses indicates the average number of moles added.

The content (% by mass) of the constitutional unit A in all the constitutional units of the copolymer is preferably 30% by mass or more, more preferably 40% by mass or more, even more preferably 50% by mass or more, still more preferably 60% by mass or more, and further preferably 75% by mass or more from the viewpoint of improving the separability of the semiconducting SWCNTs. Furthermore, the content of the constitutional unit A is preferably less than 100% by mass, more preferably 95% by mass or less, even more preferably 90% by mass or less, and further preferably 85% by mass or less from the viewpoint of improving the separability of the semiconducting SWCNTs.

The content (mol %) of the constitutional unit A in all the constitutional units of the copolymer is preferably 55 mol % or more, more preferably 70 mol % or more, even more preferably 85 mol % or more, still more preferably 90 mol % or more, and further preferably 95 mol % or more from the viewpoint of improving the separability of the semiconducting SWCNTs. Furthermore, the content of the constitutional unit A is preferably less than 100 mol %, more preferably 99 mol % or less, and further preferably 98 mol % or less from the viewpoint of improving the separability of the semiconducting SWCNTs.

The content (% by mass) of the constitutional unit B in all the constitutional units of the copolymer is preferably more than 0% by mass, more preferably 5% by mass or more, even more preferably 10% by mass or more, and further preferably 15% by mass or more from the viewpoint of improving the separability of the semiconducting SWCNTs. Furthermore, the content of the constitutional unit B is preferably 70% by mass or less, more preferably 60% by mass or less, even more preferably 50% by mass or less, still more preferably 40% by mass or less, and further preferably 25% by mass or less from the viewpoint of improving the separability of the semiconducting SWCNTs.

The content (mol %) of the constitutional unit B in all the constitutional units of the copolymer is preferably more than 0 mol %, more preferably 1 mol % or more, and further preferably 2 mol % or more from the viewpoint of improving the separability of the semiconducting SWCNTs. Furthermore, the content of the constitutional unit B is preferably 45 mol % or less, more preferably 30 mol % or less, even more preferably 15 mol % or less, still more preferably 10 mol % or less, and further preferably 5 mol % or less from the viewpoint of improving the separability of the semiconducting SWCNTs.

The total content (% by mass) of the constitutional unit A and the constitutional unit B in all the constitutional units of the copolymer is preferably 80% by mass or more, more preferably 90% by mass or more, even more preferably 95% by mass or more, still more preferably 99% by mass or more and is 100% by mass or less from the viewpoint of improving the separability of the semiconducting SWCNTs. The total content of the constitutional unit A and the constitutional unit B is further preferably substantially 100% by mass from the viewpoint of improving the separability of the semiconducting SWCNTs.

The total content (mol %) of the constitutional unit A and the constitutional unit B in all the constitutional units of the copolymer is preferably 80 mol % or more, more preferably 90 mol % or more, even more preferably 95 mol % or more, still more preferably 99 mol % or more and is 100 mol % or less from the viewpoint of improving the separability of the semiconducting SWCNTs. The total content of the constitutional unit A and the constitutional unit B is further preferably substantially 100 mol % from the viewpoint of improving the separability of the semiconducting SWCNTs.

The copolymer may further contain a constitutional unit C to the extent that it does not interfere with the effects of the present disclosure, in addition to the constitutional unit A and the constitutional unit B. Examples of the constitutional unit C include a carboxylic acid monomer such as methacrylic acid or maleic acid and a constitutional unit derived from a nonionic monomer other than the constitutional unit B. The copolymer may contain the constitutional unit C in an amount of preferably 20% by mass or less, more preferably 10% by mass or less, even more preferably 5% by mass or less, still more preferably 1% by mass or less, and the copolymer is further preferably substantially free of the constitutional unit C from the viewpoint of improving the separability of the semiconducting SWCNTs. In this case, the term "substantially free of" means that the constitutional unit C is not intentionally contained in the copolymer, but can be accidentally contained in, e.g., raw material monomers of the constitutional unit A and the constitutional unit B.

The mass ratio (A/B) of the constitutional unit A to the constitutional unit B in the copolymer is preferably 0.45 or more, more preferably 0.7 or more, even more preferably 1 or more, still more preferably 1.5 or more, and further preferably 3 or more from the viewpoint of improving the separability of the semiconducting SWCNTs. Furthermore, the mass ratio (A/B) is preferably 19 or less, more preferably 9 or less, and further preferably 6 or less from the viewpoint of improving the separability of the semiconducting SWCNTs.

The molar ratio (A/B) of the constitutional unit A to the constitutional unit B in the copolymer is preferably 1.2 or more, more preferably 2.3 or more, even more preferably 5.6 or more, still more preferably 9 or more, and further preferably 19 or more from the viewpoint of improving the separability of the semiconducting SWCNTs. Furthermore, the molar ratio (A/B) is preferably 300 or less, more preferably 100 or less, and further preferably 50 or less from the viewpoint of improving the separability of the semiconducting SWCNTs.

The weight average molecular weight of the copolymer is preferably 1000 or more, more preferably 3000 or more, and further preferably 4500 or more from the viewpoint of improving the separability of the semiconducting SWCNTs. Furthermore, the weight average molecular weight of the copolymer is preferably 300000 or less, more preferably 100000 or less, even more preferably 60000 or less, and further preferably 20000 or less from the viewpoint of improving the separability of the semiconducting SWCNTs. In the present disclosure, the weight average molecular weight of the copolymer is determined by gel permeation chromatography and can be measured specifically by a method as described in Examples.

The mass ratio (copolymer/SWCNTs) of the copolymer to the SWCNTs in the mixed solution A and in the SWCNT dispersion to be separated is preferably 1 or more, more preferably 2 or more, even more preferably 5 or more, and further preferably 10 or more from the viewpoint of improving the separability and productivity of the semiconducting SWCNTs. Furthermore, the mass ratio (copolymer/SWCNTs) is preferably 100 or less, more preferably 70 or less, and further preferably 50 or less from the viewpoint of improving the separability and productivity of the semiconducting SWCNTs.

The content of the copolymer in the mixed solution A and in the SWCNT dispersion to be separated is preferably 0.1% by mass or more, more preferably 0.2% by mass or more, even more preferably 0.5% by mass or more, and further preferably 1% by mass or more from the viewpoint of improving the separability and productivity of the semiconducting SWCNTs. Furthermore, the content of the copolymer is preferably 10% by mass or less, more preferably 7% by mass or less, and further preferably 5% by mass or less from the same viewpoint.

[SWCNT]

Any SWCNTs may be used for the preparation of the mixed solution A and the SWCNT dispersion to be separated. For example, the SWCNTs may be synthesized by a conventionally known synthesis method such as the HiPco method or the e-DIPS method, and may also differ in the way of rolling the graphene sheet and the diameter. The SWCNTs may contain metallic SWCNTs and semiconducting SWCNTs in any ratio. Commonly synthesized SWCNTs form a mixture of SWCNTs containing about ⅓ metallic SWCNTs and about ⅔ semiconducting SWCNTs.

The average diameter of the SWCNTs is preferably 0.5 nm or more, and more preferably 0.8 nm or more from the viewpoint of improving the separability of the semiconducting SWCNTs. Furthermore, the average diameter of the SWCNTs is preferably 3 nm or less, and more preferably 2 nm or less from the same viewpoint. The average diameter of the SWCNTs can be calculated by measuring the diameters of 10 or more CNTs using transmission electron microscope images and taking the average of the measured diameters.

The average length of the SWCNTs is preferably 0.1 μm or more, more preferably 0.3 μm or more, and further preferably 0.5 μm or more from the viewpoint of electrical properties. Furthermore, the average length of the SWCNTs is preferably 100 μm or less, more preferably 50 μm or less, even more preferably 20 μm or less, and further preferably 10 μm or less from the viewpoint of improving the separability and productivity of the semiconducting SWCNTs. The average length of the SWCNTs can be calculated by, e.g., measuring the lengths of 10 or more CNTs using transmission electron microscope images and taking the average of the measured lengths.

The content of the SWCNTs in the mixed solution A and in the SWCNT dispersion to be separated is preferably 0.001% by mass or more, more preferably 0.01% by mass or more, and further preferably 0.03% by mass or more from the viewpoint of improving the separability of the semiconducting SWCNTs. Furthermore, the content of the SWCNTs is preferably 5% by mass or less, more preferably 1% by mass or less, and further preferably 0.5% by mass or less from the viewpoint of improving the separability and productivity of the semiconducting SWCNTs.

[Aqueous Medium]

The mixed solution A and the SWCNT dispersion to be separated contain an aqueous medium as a dispersion medium. The aqueous medium is preferably water. The water is preferably pure water, ion-exchanged water, purified water, or distilled water, and more preferably pure water from the viewpoint of improving the separability and productivity of the semiconducting SWCNTs.

The mixed solution A and the SWCNT dispersion to be separated may contain a lower alcohol or a water-soluble organic solvent in addition to water as the aqueous medium.

Examples of the lower alcohol include methanol, ethanol, and isopropyl alcohol. Examples of the water-soluble organic solvent include acetone, tetrahydrofuran, and dimethylformamide.

When the aqueous medium is a combination of water and a dispersion medium other than water, the proportion of water in the aqueous medium is preferably 70% by mass or more, more preferably 80% by mass or more, and further preferably 90% by mass or more from the viewpoint of improving the separability of the semiconducting SWCNTs.

The content of the aqueous medium in the mixed solution A and in the SWCNT dispersion to be separated is preferably 85% by mass or more, more preferably 92% by mass or more, and further preferably 96% by mass or more from the viewpoint of improving the separability and productivity of the semiconducting SWCNTs. Furthermore, the content of the aqueous medium is preferably 99.9% by mass or less, more preferably 99.8% by mass or less, even more preferably 99.5% by mass or less, and further preferably 99.0% by mass or less from the same viewpoint.

The pH of the mixed solution A and the SWCNT dispersion to be separated is preferably 1 or more, more preferably 1.5 or more, and further preferably 2 or more from the viewpoint of improving the separability of the semiconducting SWCNTs. Furthermore, the pH is preferably 5 or less, more preferably 4 or less, and further preferably 3.5 or less from the same viewpoint. In the present disclosure, the pH of the mixed solution A and the SWCNT dispersion to be separated is a value at 25° C. and can be measured with, e.g., a pH meter (manufactured by DKK-TOA CORPORATION).

The dispersion treatment for the mixed solution A may be performed with, e.g., a disperser such as a bath-type ultrasonic disperser, a homomixer, a high-pressure homogenizer, an ultrasonic homogenizer, a jet mill, a bead mill, or a MILLSER.

In the process A, the mixed solution A may be defoamed before the dispersion treatment.

[Process B]

In the process B, the SWCNT dispersion to be separated that has been prepared in the process A is subjected to centrifugation, and a supernatant containing the semiconducting SWCNTs is collected from the centrifuged SWCNT dispersion. The supernatant has a higher proportion of the semiconducting SWCNTs with respect to the ratio of the semiconducting SWCNTs to the metallic SWCNTs in the SWCNT dispersion to be separated before the centrifugation. This proportion may vary depending on, e.g., the centrifugation conditions, and the rotation speed of the centrifuge is preferably 5,000 rpm or more, and more preferably 10,000 rpm or more from the viewpoint of improving the separability and productivity of the semiconducting SWCNTs. Furthermore, the rotation speed of the centrifuge is preferably 100,000 rpm or less, and more preferably 70,000 rpm or less from the same viewpoint. The gravitational acceleration of the centrifuge is preferably 10 kG or more, and more preferably 50 kG or more from the viewpoint of improving the separability and productivity of the semiconducting SWCNTs. Furthermore, the gravitational acceleration of the centrifuge is preferably 1000 kG or less, and more preferably 500 kG or less from the same viewpoint.

The separability of the semiconducting SWCNTs in the supernatant obtained in the process B is preferably 1.1 or more, more preferably 1.3 or more, even more preferably 1.4 or more, still more preferably 1.6 or more, and further preferably 2.0 or more from the viewpoint of semiconductor characteristics. Furthermore, the separability of the semiconducting SWCNTs is preferably 100 or less from the viewpoint of yield. In the present disclosure, the separability of the semiconducting SWCNTs is a value determined by the following formula.

$$\frac{I_S(\text{peak intensity of absorption wavelength specific to semiconducting } SWCNTs)}{I_M(\text{peak intensity of absorption wavelength specific to metallic } SWCNTs)} =$$

Separability of semiconducting $SWCNTs$

[Numerical Expression 1]

In one or more embodiments, the supernatant obtained in the process B is an aqueous dispersion containing the semiconducting SWCNTs and the copolymer. In other words, one aspect of the present disclosure relates to an aqueous dispersion containing the semiconducting SWCNTs and the copolymer that contains a constitutional unit A derived from a monomer represented by the formula (1) and a constitutional unit B derived from a monomer represented by the formula (3).

[Method for Producing Semiconducting SWCNT, and Semiconducting SWCNT]

The semiconducting SWCNTs can be produced by collecting the semiconducting SWCNTs from the semiconducting SWCNT dispersion that has been obtained by the method for producing a semiconducting SWCNT dispersion of the present disclosure. The semiconducting SWCNTs may be collected from the semiconducting SWCNT dispersion by, e.g., filtering the semiconducting SWCNT dispersion through a membrane filter to separate out the semiconducting SWCNTs, and then drying the semiconducting SWCNTs. When the semiconducting SWCNTs are filtered out from the semiconducting SWCNT dispersion, a pretreatment such as reprecipitation of the semiconducting SWCNTs in the semiconducting SWCNT dispersion may be performed before the filtration. Alternatively, the semiconducting SWCNTs may be collected from the semiconducting SWCNT dispersion by, e.g., drying the semiconducting SWCNT dispersion and removing the coexisting copolymer by means of cleaning, thermal decomposition, or the like. Alternatively, the semiconducting SWCNT dispersion may be used as semiconducting SWCNTs without a further separation treatment.

Thus, in one aspect, the present disclosure relates to a method for producing semiconducting SWCNTs (also referred to as a "production method A of semiconducting SWCNTs of the present disclosure" in the following). The production method A of semiconducting SWCNTs of the present disclosure includes filtering the semiconducting SWCNT dispersion obtained by the method for producing a semiconducting SWCNT dispersion of the present disclosure and collecting the semiconducting SWCNTs.

In another aspect, the present disclosure relates to a method for producing semiconducting SWCNTs (also referred to as a "production method B of semiconducting SWCNTs of the present disclosure" in the following). The production method B of semiconducting SWCNTs of the present disclosure includes drying the semiconducting SWCNT dispersion obtained by the method for producing a semiconducting SWCNT dispersion of the present disclosure to give a mixture containing the semiconducting SWCNTs and the copolymer, and removing the copolymer from the mixture and collecting the semiconducting SWCNTs.

In another aspect, the present disclosure relates to a method for producing semiconducting SWCNTs (also referred to as a "production method C of semiconducting SWCNTs of the present disclosure" in the following). The production method C of semiconducting SWCNTs of the present disclosure includes obtaining the semiconducting SWCNTs without performing a further separation treatment of the semiconducting SWCNT dispersion obtained by the method for producing a semiconducting SWCNT dispersion of the present disclosure.

In another aspect, the present disclosure relates to semiconducting SWCNTs (also referred to as "semiconducting SWCNTs of the present disclosure" in the following) obtained by the production method A or B or C of semiconducting SWCNTs of the present disclosure.

[Method for Producing Ink Containing Semiconducting SWCNT]

In one aspect, the present disclosure relates to a method for producing an ink containing semiconducting SWCNTs (also referred to as a "production method of a semiconducting SWCNT containing ink of the present disclosure" in the following). The production method of a semiconducting SWCNT containing ink of the present disclosure includes, as a process, the method for producing a semiconducting SWCNT dispersion of the present disclosure or the method for producing semiconducting SWCNTs of the present disclosure. An embodiment of the production method of a semiconducting SWCNT containing ink of the present disclosure includes, e.g., the production method A or B or C of semiconducting SWCNTs of the present disclosure as a process, and further includes mixing the semiconducting SWCNTs and at least one of an organic solvent and water, and optionally at least one of a surfactant and a resin. Another embodiment of the production method of a semiconducting SWCNT containing ink of the present disclosure includes, e.g., the method for producing a semiconducting SWCNT dispersion of the present disclosure as a process, and also includes mixing the semiconducting SWCNT dispersion and optionally an organic solvent, a surfactant, and a resin that are miscible with the dispersion.

Examples of the organic solvent include the following: aliphatic solvents such as n-hexane, n-octane, and n-decane; alicyclic solvents such as cyclohexane; aromatic solvents such as benzene and toluene; alcoholic solvents such as methanol and ethanol; and glycol ether solvents such as diethylene glycol monomethyl ether, propylene glycol monomethyl ether acetate, and butyl cellosolve. From the viewpoint of improving film forming properties, the ink containing semiconducting SWCNTs may further contain, e.g., polystyrene resin, acrylic resin, or vinyl resin as the resin that can be dissolved or dispersed in the solvent, a surfactant known as a dispersant, and other additives. The content of the semiconducting SWCNTs in the ink may be appropriately set in accordance with the intended use.

[Ink Containing Semiconducting SWCNT]

In one aspect, the present disclosure relates to an ink containing semiconducting SWCNTs (also referred as a "semiconducting SWCNT containing ink of the present disclosure" in the following). The semiconducting SWCNT containing ink of the present disclosure contains semiconducting SWCNTs, at least one of an organic solvent and water, and a copolymer containing a constitutional unit A derived from a monomer represented by the formula (1) and a constitutional unit B derived from a monomer represented by the formula (3).

An embodiment of the semiconducting SWCNT containing ink of the present disclosure contains at least the semiconducting SWCNTs of the present disclosure, the copolymer containing the constitutional unit A derived from the monomer represented by the formula (1) and the constitutional unit B derived from the monomer represented by the formula (3), and at least one of an organic solvent and water, and optionally a surfactant and a resin.

[Method for Producing Semiconductor Device]

One aspect of the present disclosure relates to a method for producing a semiconductor device. The method includes printing or applying the semiconducting SWCNT containing ink obtained by the production method of a semiconducting SWCNT containing ink of the present disclosure on a substrate to form a semiconductor layer.

Another aspect of the present disclosure relates to a method for producing a semiconductor device including a substrate, and a gate electrode, a source electrode, and a drain electrode that are disposed on the substrate. The method includes printing or applying the semiconducting SWCNT containing ink on the substrate to form a semiconductor circuit or a semiconductor film (semiconductor layer). The semiconducting SWCNT containing ink may be printed by, e.g., ink jet printing, screen printing, offset printing, or letterpress printing. The method may also include forming a semiconductor film by printing or applying the semiconducting SWCNT containing ink, and then optionally etching the semiconductor film to form a circuit.

Regarding the above embodiments, the present invention further discloses a method for producing a semiconducting single-walled carbon nanotube dispersion, a method for separating semiconducting single-walled carbon nanotubes from metallic single-walled carbon nanotubes, a method for producing an ink containing semiconducting single-walled carbon nanotubes, and an ink containing semiconducting single-walled carbon nanotubes as follows.

<1> A method for producing a semiconducting single-walled carbon nanotube dispersion or a method for separating semiconducting single-walled carbon nanotubes from metallic single-walled carbon nanotubes, comprising:

(A) preparing a single-walled carbon nanotube dispersion to be separated that contains single-walled carbon nanotubes composed of semiconducting single-walled carbon nanotubes and metallic single-walled carbon nanotubes, an aqueous medium, and a copolymer containing a constitutional unit A derived from a monomer represented by the following formula (1) and a constitutional unit B derived from a monomer represented by the following formula (3); and (B) centrifuging the single-walled carbon nanotube dispersion to be separated and then collecting a supernatant containing the semiconducting single-walled carbon nanotubes from the centrifuged single-walled carbon nanotube dispersion, $$CH_2=CH-COOM \quad (1)$$

where M represents a hydrogen atom, a metal atom, or a group with a structure represented by the following formula (2):

[Chemical Formula 7]

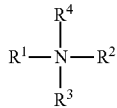
(2)

where $R^1$, $R^2$, $R^3$, and $R^4$ each independently represent a hydrogen atom or an alkyl group having 1 to 2 carbon atoms and optionally containing a hydroxyl group, $$CH_2=CR^5—COO—(CH_2CH_2O)_q—H \quad (3)$$

where $R^5$ represents a hydrogen atom or a methyl group, and q represents an average number of moles of an ethyleneoxy group added and is 2 to 120.

<2> The method for producing a semiconducting single-walled carbon nanotube dispersion or the method for separating semiconducting single-walled carbon nanotubes from metallic single-walled carbon nanotubes according to <1>, comprising:

(A) preparing a single-walled carbon nanotube dispersion to be separated that contains single-walled carbon nanotubes composed of semiconducting single-walled carbon nanotubes and metallic single-walled carbon nanotubes, an aqueous medium, and a copolymer containing a constitutional unit A derived from a monomer represented by the following formula (1) and a constitutional unit B derived from a monomer represented by the following formula (3); and (B) centrifuging the single-walled carbon nanotube dispersion to be separated and then collecting a supernatant containing the semiconducting single-walled carbon nanotubes from the centrifuged single-walled carbon nanotube dispersion, $$CH_2=CH—COOM \quad (1)$$

where M represents a hydrogen atom, a metal atom, or a group with a structure represented by the following formula (2);

[Chemical Formula 8]

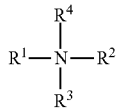
(2)

where $R^1$, $R^2$, $R^3$, and $R^4$ each independently represent a hydrogen atom or an alkyl group having 1 to 2 carbon atoms and optionally containing a hydroxyl group, $$CH_2=CR^5—COO—(CH_2CH_2O)_q—H \quad (3)$$

where $R^5$ represents a hydrogen atom or a methyl group, and q represents an average number of moles of an ethyleneoxy group added and is 2 to 45.

<3> The method for producing a semiconducting single-walled carbon nanotube dispersion or the method for separating semiconducting single-walled carbon nanotubes from metallic single-walled carbon nanotubes according to <1> or <2>, comprising:

(A) preparing a single-walled carbon nanotube dispersion to be separated that contains single-walled carbon nanotubes composed of semiconducting single-walled carbon nanotubes and metallic single-walled carbon nanotubes, an aqueous medium, and a copolymer containing a constitutional unit A derived from a monomer represented by the following formula (1) and a constitutional unit B derived from a monomer represented by the following formula (3); and (B) centrifuging the single-walled carbon nanotube dispersion to be separated and then collecting a supernatant containing the semiconducting single-walled carbon nanotubes from the centrifuged single-walled carbon nanotube dispersion, wherein a content of the constitutional unit A in all the constitutional units of the copolymer is 55 mol % or more and less than 100 mol %, and a content of the constitutional unit B in all the constitutional units of the copolymer is more than 0 mol % and 45 mol % or less, $$CH_2=CH—COOM \quad (1)$$

where M represents a hydrogen atom,

[Chemical Formula 9]

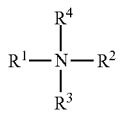
(2)

where $R^1$, $R^2$, $R^3$, and $R^4$ each independently represent a hydrogen atom or an alkyl group having 1 to 2 carbon atoms and optionally containing a hydroxyl group, $$CH_2=CR^5—COO—(CH_2CH_2O)_q—H \quad (3)$$

where $R^5$ represents a hydrogen atom or a methyl group, and q represents an average number of moles of an ethyleneoxy group added and is 2 to 45.

<4> The method for producing a semiconducting single-walled carbon nanotube dispersion or the method for separating semiconducting single-walled carbon nanotubes from metallic single-walled carbon nanotubes according to any one of <1> to <3>, comprising:

(A) preparing a single-walled carbon nanotube dispersion to be separated that contains single-walled carbon nanotubes composed of semiconducting single-walled carbon nanotubes and metallic single-walled carbon nanotubes, an aqueous medium, and a copolymer containing a constitutional unit A derived from a monomer represented by the following formula (1) and a constitutional unit B derived from a monomer represented by the following formula (3); and (B) centrifuging the single-walled carbon nanotube dispersion to be separated and then collecting a supernatant containing the semiconducting single-walled carbon nanotubes from the centrifuged single-walled carbon nanotube dispersion, wherein the content of the constitutional unit A in all the constitutional units of the copolymer is 55 mol % or more and less than 100 mol %, the content of the constitutional unit B in all the constitutional units of the copolymer is more than 0 mol % and 45 mol % or less, and the total content of the constitutional unit A and the constitutional unit B in all the constitutional units of the copolymer is 90 mol % or more and 100 mol % or less, $$CH_2=CH—COOM \quad (1)$$

where M represents a hydrogen atom,

[Chemical Formula 10]

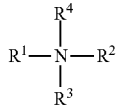
(2)

where $R^1$, $R^2$, $R^3$, and $R^4$ each independently represent a hydrogen atom or an alkyl group having 1 to 2 carbon atoms and optionally containing a hydroxyl group,

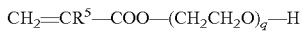
(3)

where $R^5$ represents a hydrogen atom or a methyl group, and q represents an average number of moles of an ethyleneoxy group added and is 2 to 45.

<5> The method for producing a semiconducting single-walled carbon nanotube dispersion or the method for separating semiconducting single-walled carbon nanotubes from metallic single-walled carbon nanotubes according to any one of <1> to <4>, comprising:
(A) preparing a single-walled carbon nanotube dispersion to be separated that contains single-walled carbon nanotubes composed of semiconducting single-walled carbon nanotubes and metallic single-walled carbon nanotubes, an aqueous medium, and a copolymer containing a constitutional unit A derived from a monomer represented by the following formula (1) and a constitutional unit B derived from a monomer represented by the following formula (3); and
(B) centrifuging the single-walled carbon nanotube dispersion to be separated and then collecting a supernatant containing the semiconducting single-walled carbon nanotubes from the centrifuged single-walled carbon nanotube dispersion,
wherein the content of the constitutional unit A in all the constitutional units of the copolymer is 55 mol % or more and less than 100 mol %, the content of the constitutional unit B in all the constitutional units of the copolymer is more than 0 mol % and 45 mol % or less, and the total content of the constitutional unit A and the constitutional unit B in all the constitutional units of the copolymer is 90 mol % or more and 100 mol % or less, and
a molar ratio (A/B) of the constitutional unit A to the constitutional unit B in the copolymer is 2.3 or more and 50 or less,

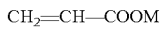
(1)

where M represents a hydrogen atom,

[Chemical Formula 11]

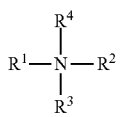
(2)

where $R^1$, $R^2$, $R^3$, and $R^4$ each independently represent a hydrogen atom or an alkyl group having 1 to 2 carbon atoms and optionally containing a hydroxyl group,

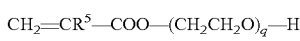
(3)

where $R^5$ represents a hydrogen atom or a methyl group, and q represents an average number of moles of an ethyleneoxy group added and is 2 to 45.

<6> The method for producing a semiconducting single-walled carbon nanotube dispersion or the method for separating semiconducting single-walled carbon nanotubes from metallic single-walled carbon nanotubes according to any one of <1> to <5>, wherein q in the formula (3) is 2 to 25.

<7> The method for producing a semiconducting single-walled carbon nanotube dispersion or the method for separating semiconducting single-walled carbon nanotubes from metallic single-walled carbon nanotubes according to any one of <1> to <6>, wherein a weight average molecular weight of the copolymer is 3000 or more and 100000 or less.

<8> The method for producing a semiconducting single-walled carbon nanotube dispersion or the method for separating semiconducting single-walled carbon nanotubes from metallic single-walled carbon nanotubes according to any one of <1> to <7>, wherein the single-walled carbon nanotube dispersion to be separated has a pH of 1 or more and 5 or less.

<9> The method for producing a semiconducting single-walled carbon nanotube dispersion or the method for separating semiconducting single-walled carbon nanotubes from metallic single-walled carbon nanotubes according to any one of <1> to <8>, wherein a mass ratio (copolymer/carbon nanotubes) of the copolymer to the carbon nanotubes in the single-walled carbon nanotube dispersion to be separated is 5 or more and 50 or less.

<10> The method for producing a semiconducting single-walled carbon nanotube dispersion or the method for separating semiconducting single-walled carbon nanotubes from metallic single-walled carbon nanotubes according to any one of <1> to <9>, wherein a content of the copolymer in the single-walled carbon nanotube dispersion to be separated is 0.5% by mass or more and 5% by mass or less.

<11> The method for producing a semiconducting single-walled carbon nanotube dispersion or the method for separating semiconducting single-walled carbon nanotubes from metallic single-walled carbon nanotubes according to any one of <1> to <10>, wherein a content of the carbon nanotubes in the single-walled carbon nanotube dispersion to be separated is 0.03% by mass or more and 0.5% by mass or less.

<12> The method for producing a semiconducting single-walled carbon nanotube dispersion or the method for separating semiconducting single-walled carbon nanotubes from metallic single-walled carbon nanotubes according to any one of <1> to <11>, wherein an average diameter of the single-walled carbon nanotubes used for preparing the single-walled carbon nanotube dispersion to be separated in the process (A) is 0.5 nm or more and 2 nm or less.

<13> A method for producing a semiconducting single-walled carbon nanotube dispersion, comprising:
(A) preparing a single-walled carbon nanotube dispersion to be separated that contains single-walled carbon nanotubes composed of semiconducting single-walled carbon nanotubes and metallic single-walled carbon nanotubes, an aqueous medium, and a copolymer containing a constitutional unit A derived from a monomer represented by the above formula (1) and a constitutional unit B derived from a monomer represented by the above formula (3); and
(B) centrifuging the single-walled carbon nanotube dispersion to be separated and then collecting a supernatant containing the semiconducting single-walled carbon nanotubes from the centrifuged single-walled carbon nanotube dispersion, wherein a content of the constitutional unit A in all the constitutional units of the copolymer is 55 mol % or more and less than 100 mol %, and a molar ratio (A/B) of the constitutional unit A to the constitutional unit B in the copolymer is 1.2 or more and 300 or less.

<14> A method for producing a semiconducting single-walled carbon nanotube dispersion, comprising:

(A) preparing a single-walled carbon nanotube dispersion to be separated that contains single-walled carbon nanotubes composed of semiconducting single-walled carbon nanotubes and metallic single-walled carbon nanotubes, an aqueous medium, and a copolymer containing a constitutional unit A derived from a monomer represented by the above formula (1) and a constitutional unit B derived from a monomer represented by the above formula (3); and (B) centrifuging the single-walled carbon nanotube dispersion to be separated and then collecting a supernatant containing the semiconducting single-walled carbon nanotubes from the centrifuged single-walled carbon nanotube dispersion, wherein an average diameter of the single-walled carbon nanotubes used for preparing the single-walled carbon nanotube dispersion to be separated in the process (A) is 0.5 nm or more and 2 nm or less, and a content of the constitutional unit A in all the constitutional units of the copolymer is 55 mol % or more and less than 100 mol %.

<15> A method for producing a semiconducting single-walled carbon nanotube dispersion, comprising:

(A) preparing a single-walled carbon nanotube dispersion to be separated that contains single-walled carbon nanotubes composed of semiconducting single-walled carbon nanotubes and metallic single-walled carbon nanotubes, an aqueous medium, and a copolymer containing a constitutional unit A derived from a monomer represented by the above formula (1) and a constitutional unit B derived from a monomer represented by the above formula (3); and (B) centrifuging the single-walled carbon nanotube dispersion to be separated and then collecting a supernatant containing the semiconducting single-walled carbon nanotubes from the centrifuged single-walled carbon nanotube dispersion, wherein an average diameter of the single-walled carbon nanotubes used for preparing the single-walled carbon nanotube dispersion to be separated in the process (A) is 0.5 nm or more and 2 nm or less, a content of the constitutional unit A in all the constitutional units of the copolymer is 55 mol % or more and less than 100 mol %, and a molar ratio (A/B) of the constitutional unit A to the constitutional unit B in the copolymer is 1.2 or more and 300 or less.

<16> A method for producing semiconducting single-walled carbon nanotubes, comprising:

filtering the semiconducting single-walled carbon nanotube dispersion obtained by the method according to any one of <1> to <15> and collecting the semiconducting single-walled carbon nanotubes.

<17> A method for producing semiconducting single-walled carbon nanotubes, comprising:

drying the semiconducting single-walled carbon nanotube dispersion obtained by the method according to any one of <1> to <15> to give a mixture containing the semiconducting single-walled carbon nanotubes and the copolymer; and removing the copolymer from the mixture and collecting the semiconducting single-walled carbon nanotubes.

<18> A method for producing semiconducting single-walled carbon nanotubes, comprising:

obtaining the semiconducting single-walled carbon nanotubes without performing a further separation treatment of the semiconducting single-walled carbon nanotube dispersion obtained by the method according to any one of <1> to <15>.

<19> A method for producing an ink containing semiconducting single-walled carbon nanotubes, comprising:

the production method according to any one of <1> to <18> as a process.

<20> An ink containing semiconducting single-walled carbon nanotubes, comprising:

semiconducting single-walled carbon nanotubes;

at least one selected from the group consisting of an organic solvent and water; and the copolymer as defined in any one of <1> to <7>.

<21> An aqueous dispersion, comprising:

semiconducting single-walled carbon nanotubes; and a copolymer containing a constitutional unit A derived from a monomer represented by the above formula (1) and a constitutional unit B derived from a monomer represented by the above formula (3).

<22> Use of a copolymer for separation of semiconducting single-walled carbon nanotubes, the copolymer containing a constitutional unit A derived from a monomer represented by the above formula (1) and a constitutional unit B derived from a monomer represented by the above formula (3).

EXAMPLES

Hereinafter, the present disclosure will be described in more detail by way of examples. The following examples are illustrative only and the present disclosure is not limited to the examples.

1. Method for Measuring Various Parameters

[Measurement of Weight Average Molecular Weight of Copolymer]

The weight average molecular weight of the copolymer used for preparing the SWCNT dispersion to be separated was measured by gel permeation chromatography (also referred to as "GPC" in the following) under the following conditions.

<GPC Conditions>

Measuring device: HLC-8320 GPC (manufactured by Tosoh Corporation)

Column: $\alpha$-M+$\alpha$-M (manufactured by Tosoh Corporation)

Eluant: N,N-dimethylformamide (DMF) solution of 60 mmol/L of $H_3PO_4$ and 50 mmol/L of LiBr Flow rate: 1.0 mL/min Column temperature: 40° C.

Detector: RI

Sample size: 0.5 mg/mL

Standard substance: monodisperse polystyrene (manufactured by Tosoh Corporation)

[Measurement of Average Diameter and Average Length of SWCNT]

The average diameter and average length of SWCNTs were calculated by measuring the diameters and lengths of 10 or more CNTs using transmission electron microscope AE-400: polyethylene glycol (10) monoacrylate ("BLEMMER AE-400" manufactured by NOF CORPORATION) (In the formula (3), $R^5$ is methyl and q is 10.)
AE-200: polyethylene glycol (4.5) monoacrylate ("BLEMMER AE-200" manufactured by NOF CORPORATION) (In the formula (3), $R^5$ is methyl and q is 4.5.)

TABLE 1

| | Monomer of constitutional unit A | | Monomer of constitutional unit B | | Polymerization conditions | | Weight average molecular weight |
|---|---|---|---|---|---|---|---|
| | | | | | Chain transfer | Polymerization | |
| Copolymer | Type | mol % (% by mass) | Type | mol % (% by mass) | agent mol % (with respect to monomer) | initiator mol % (with respect to monomer) | |
| a | AA | 96.5 (80) | AE-400 | polyethylene glycol (10) monoacrylate | 3.5 (20) | 4.0 | 1.0 | 5200 |
| b | AA | 87.4 (50) | AE-400 | polyethylene glycol (10) monoacrylate | 12.6 (50) | 0.5 | 1.0 | 54000 |
| c | AA | 93.3 (80) | AE-200 | polyethylene glycol (4.5) monoacrylate | 6.7 (20) | 2.5 | 1.0 | 9400 |
| d | AA | 96.5 (80) | AE-400 | polyethylene glycol (10) monoacrylate | 3.5 (20) | 2.5 | 1.0 | 14000 |
| e | AA | 94.2 (70) | AE-400 | polyethylene glycol (10) monoacrylate | 5.8 (30) | 1.0 | 1.0 | 29000 | images and taking the average of the measured diameters and the average of the measured lengths, respectively.

2. Production of Copolymers a to e

[Copolymer a]

30 g of ultrapure water (manufactured by FUJIFILM Wako Pure Chemical Corporation) was charged in a reaction vessel equipped with an agitator, a reflux tube, a thermometer, a dropping funnel 1, and a dropping funnel 2, and the reaction system was replaced with nitrogen while stirring. Then, the temperature was increased to 80° C. A mixed solution was prepared for the dropping funnel 1, which contained 40 g (96.5 mol %) of acrylic acid, 10 g (3.5 mol %) of polyethylene glycol (10) monoacrylate (AE-400), and 10 g of ultrapure water. A mixed solution was prepared for the dropping funnel 2, which contained 2.57 g (4.0 mol % with respect to the total monomer) of 3-mercapto-1,2-propanediol (manufactured by FUJIFILM Wako Pure Chemical Corporation) as a chain transfer agent, 2.51 g (1.0 mol % with respect to the total monomer) of 2,2'-azobis[N-(2-carboxyethyl)-2-methylpropioamidine] tetrahydrate ("VA-057" manufactured by FUJIFILM Wako Pure Chemical Corporation) as a polymerization initiator, and 76.7 g of ultrapure water. These mixed solutions were simultaneously added dropwise to the reaction vessel through the respective dropping funnels 1, 2 over 1 hour. After completion of the dropping, the mixture was aged for 1 hour with stirring and the reaction was finished, so that a copolymer a was produced.

[Copolymers b to e]

Copolymers b to e were produced in the same manner as the production method of the copolymer a except that the monomers, the amount of the chain transfer agent, and the amount of the polymerization initiator were changed as shown in Table 1.

Table 1 shows the composition and the weight average molecular weight of each of the resulting copolymers a to e.

The monomers used in the production of the copolymers are as follows.

AA: acrylic acid ("special grade" manufactured by FUJIFILM Wako Pure Chemical Corporation)

3. Preparation of Semiconducting SWCNT Dispersion

Examples 1 to 5

Each of the compounds shown in Table 2 was dissolved in ultrapure water (manufactured by Wako Pure Chemical Industries, Ltd.) to make a 3 mass % aqueous solution. Then, 30 mg of a SWCNT mixture synthesized by the HiPco method ("HiPco-Raw" manufactured by NanoIntegris Technologies, Inc., average diameter: 0.8 to 1.2 nm, average length: 0.4 to 0.7 was added to 30 mL of the 3 mass % aqueous solution of the compound to form a mixed solution.

Next, the mixed solution was dispersed with an ultrasonic homogenizer ("450D" manufactured by BRANSON) at an amplitude of 30% and a temperature of 10° C. for 10 minutes while stirring with a stirrer, thus providing a SWCNT dispersion to be separated in Examples 1 to 5, as shown in Table 2. Table 2 shows the type and content of each component in the respective SWCNT dispersions to be separated. The contents of the SWCNT mixture and the compound in each of the SWCNT dispersions to be separated are shown in Table 2. The content of water is the remainder left after subtracting the SWCNT mixture and the compound from the SWCNT dispersion to be separated.

The SWCNT dispersion to be separated was centrifuged with an ultracentrifuge ("CS100 GXII" rotor S50A manufactured by Hitachi Koki Co., Ltd.) at a rotation speed of 50000 rpm, a gravitational acceleration of 210 kG, and a temperature of 20° C. for 30 minutes. Then, 80% by volume of the supernatant, as measured from the liquid level, was collected so as to prevent the settled sediment from rising. Thus, a semiconducting SWCNT dispersion was produced in Examples 1 to 5.

Comparative Example 1

A SWCNT dispersion to be separated and a supernatant (i.e., a semiconducting SWCNT dispersion) in Comparative Example 1 were obtained in the same manner as Example 1 except that a compound f(polyoxyethylene (100) stearyl ether ("Brij S100" manufactured by Sigma-Aldrich)) was used instead of the copolymer. The contents of the SWCNT mixture and the compound in the SWCNT dispersion to be separated are shown in Table 2. The content of water is the remainder left after subtracting the SWCNT mixture and the compound from the SWCNT dispersion to be separated.

4. Evaluation

[Evaluation of Separability]

Using an ultraviolet-visible-near infrared spectrophotometer capable of measuring visible to infrared light ("UV-3600 Plus" manufactured by Shimadzu Corporation), an absorbance was measured. The ratio of the peak intensity indicating semiconducting SWCNTs to the peak intensity indicating metallic SWCNTs was calculated and used as evaluation criteria of the separability of the semiconducting SWCNTs from the metallic SWCNTs. The higher the calculated value, the higher the separability of the semiconducting SWCNTs. Table 2 shows the results.

$$\frac{I_S(\text{peak intensity of absorption wavelength specific to semiconducting } SWCNTs)}{I_M(\text{peak intensity of absorption wavelength specific to metallic } SWCNTs)} =$$ [Numerical Expression 2]

Separability of semiconducting $SWCNTs$

The SWCNTs (HIPCO) used have an intrinsic wavelength of the semiconducting SWCNTs at around 730 nm and an intrinsic wavelength of the metallic SWCNTs at around 480 nm.

TABLE 2

| | SWCNT dispersion to be separated | | | | | | |
|---|---|---|---|---|---|---|---|
| | SWCNT mixture | | Compound | | | | |
| | Content (% by mass) | Type | Content (% by mass) | Constitutional unit A (% by mass) | Constitutional unit B (% by mass) | Aqueous medium Type | pH | Evaluation Separability |
| Ex. 1 | 0.1 | a | 3 | 80 | 20 | water | 2.80 | 2.82 |
| Ex. 2 | 0.1 | b | 3 | 50 | 50 | water | 3.17 | 1.50 |
| Ex. 3 | 0.1 | c | 3 | 80 | 20 | water | 2.59 | 2.05 |
| Ex. 4 | 0.1 | d | 3 | 80 | 20 | water | 2.81 | 2.05 |
| Ex. 5 | 0.1 | r | 3 | 70 | 30 | water | 2.82 | 1.85 |
| Comp. Ex. 1 | 0.1 | f*[1] | 3 | — | — | water | 3.87 | 0.93 |

*[1]polyoxyethylene (100) stearyl ether

As shown in Table 2, the separated SWCNT dispersions in Examples 1 to 5 are superior to the separated SWCNT dispersion in Comparative Example 1 in the separability of the semiconducting SWCNTs.

INDUSTRIAL APPLICABILITY

As described above, the method for producing a semiconducting SWCNT dispersion of the present disclosure allows semiconducting SWCNTs to be separated from metallic SWCNTs in an aqueous medium without the use of e.g., a density gradient agent, and yet requires only an easily available separation agent and a simple operation. Thus, the present disclose can improve the production efficiency not only in the method for producing a semiconducting SWCNT dispersion, but also in the method for producing semiconducting SWCNTs themselves.

The invention claimed is:

1. A method for producing a semiconducting single-walled carbon nanotube dispersion, comprising:
   (A) preparing a single-walled carbon nanotube dispersion to be separated that contains single-walled carbon nanotubes composed of semiconducting single-walled carbon nanotubes and metallic single-walled carbon nanotubes, an aqueous medium, and a copolymer containing a constitutional unit A derived from a monomer represented by the following formula (1) and a constitutional unit B derived from a monomer represented by the following formula (3); and
   (B) centrifuging the single-walled carbon nanotube dispersion to be separated and then collecting a supernatant containing the semiconducting single-walled carbon nanotubes from the centrifuged single-walled carbon nanotube dispersion,

$$CH_2=CH-COOM \qquad (1)$$

where M represents a hydrogen atom, a metal atom, or a group with a structure represented by the following formula (2):

$$\begin{array}{c} R^4 \\ | \\ R^1-N-R^2 \\ | \\ R^3 \end{array} \qquad (2)$$

where $R^1$, $R^2$, $R^3$, and $R^4$ each independently represent a hydrogen atom or an alkyl group having 1 to 2 carbon atoms and optionally containing a hydroxyl group,

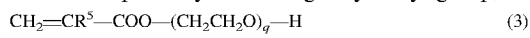
$$CH_2=CR^5-COO-(CH_2CH_2O)_q-H \qquad (3)$$

where $R^5$ represents a hydrogen atom or a methyl group, and q represents an average number of moles of an ethyleneoxy group added and is 2 to 120.

2. The method for producing a semiconducting single-walled carbon nanotube dispersion according to claim 1, wherein a content of the constitutional unit A in all constitutional units of the copolymer is 55 mol % or more and less than 100 mol %.

3. The method for producing a semiconducting single-walled carbon nanotube dispersion according to claim 1, wherein a content of the constitutional unit B in all constitutional units of the copolymer is more than 0 mol % and 45 mol % or less.

4. The method for producing a semiconducting single-walled carbon nanotube dispersion according to claim 1, wherein a total content of the constitutional unit A and the constitutional unit B in all constitutional units of the copolymer is 80 mol % or more and 100 mol % or less.

5. The method for producing a semiconducting single-walled carbon nanotube dispersion according to claim 1, wherein a molar ratio (A/B) of the constitutional unit A to the constitutional unit B in the copolymer is 1.2 or more and 300 or less.

6. The method for producing a semiconducting single-walled carbon nanotube dispersion according to claim 1, wherein an average diameter of the single-walled carbon nanotubes used for preparing the single-walled carbon nanotube dispersion to be separated in the process (A) is 0.5 nm or more and 2 nm or less.

7. The method for producing a semiconducting single-walled carbon nanotube dispersion according to claim 1, wherein separability of the semiconducting single-walled carbon nanotubes in the supernatant obtained in the process (B) is 1.3 or more, and the separability of the semiconducting single-walled carbon nanotubes (semiconducting SWCNTs) is a value determined by the following formula $$\frac{I_S(\text{peak intensity of absorption wavelength specific to semiconducting } SWCNTs)}{I_M(\text{peak intensity of absorption wavelength specific to metallic } SWCNTs)} = $$

Separability of semiconducting $SWCNTs$.

8. A method for producing semiconducting single-walled carbon nanotubes, comprising:
filtering the semiconducting single-walled carbon nanotube dispersion obtained by the method according to claim 1 and collecting the semiconducting single-walled carbon nanotubes.

9. A method for producing semiconducting single-walled carbon nanotubes, comprising:
drying the semiconducting single-walled carbon nanotube dispersion obtained by the method according to claim 1 to give a mixture containing the semiconducting single-walled carbon nanotubes and the copolymer; and
removing the copolymer from the mixture and collecting the semiconducting single-walled carbon nanotubes.

10. A method for producing semiconducting single-walled carbon nanotubes, comprising:
obtaining the semiconducting single-walled carbon nanotubes without performing a further separation treatment of the semiconducting single-walled carbon nanotube dispersion obtained by the method according to claim 1.

11. The method for producing a semiconducting single-walled carbon nanotube dispersion according to claim 1, wherein M represents a hydrogen atom in the formula (1).

12. The method for producing a semiconducting single-walled carbon nanotube dispersion according to claim 1, wherein q is 3 or more and 12 or less in the formula (3).

13. The method for producing a semiconducting single-walled carbon nanotube dispersion according to claim 1, wherein a content (% by mass) of the constitutional unit A in all constitutional units of the copolymer is 40% by mass or more and 90% by mass or less.

14. The method for producing a semiconducting single-walled carbon nanotube dispersion according to claim 1, wherein a content (% by mass) of the constitutional unit B in all constitutional units of the copolymer is 10% by mass or more and 60% by mass or less.

15. The method for producing a semiconducting single-walled carbon nanotube dispersion according to claim 1, wherein a mass ratio (copolymer/SWCNTs) of the copolymer to the single-walled carbon nanotubes (SWCNTs) in the single-walled carbon nanotube dispersion to be separated is 10 or more and 50 or less.

16. A method for separating semiconducting single-walled carbon nanotubes from metallic single-walled carbon nanotubes, comprising:

(A) preparing a single-walled carbon nanotube dispersion to be separated that contains single-walled carbon nanotubes composed of semiconducting single-walled carbon nanotubes and metallic single-walled carbon nanotubes, an aqueous medium, and a copolymer containing a constitutional unit A derived from a monomer represented by the following formula (1) and a constitutional unit B derived from a monomer represented by the following formula (3); and (B) centrifuging the single-walled carbon nanotube dispersion to be separated and then collecting a supernatant containing the semiconducting single-walled carbon nanotubes from the centrifuged single-walled carbon nanotube dispersion, $$CH_2=CH-COOM \quad (1)$$

where M represents a hydrogen atom, a metal atom, or a group with a structure represented by the following formula (2):

(2)

where $R^1$, $R^2$, $R^3$, and $R^4$ each independently represent a hydrogen atom or an alkyl group having 1 to 2 carbon atoms and optionally containing a hydroxyl group, $$CH_2=CR^5-COO-(CH_2CH_2O)_q-H \quad (3)$$

where $R^5$ represents a hydrogen atom or a methyl group, and q represents an average number of moles of an ethyleneoxy group added and is 2 to 120.

17. An aqueous dispersion comprising:
semiconducting single-walled carbon nanotubes; and
a copolymer containing a constitutional unit A derived from a monomer represented by the following formula (1) and a constitutional unit B derived from a monomer represented by the following formula (3), $$CH_2=CH-COOM \quad (1)$$

where M represents a hydrogen atom, a metal atom, or a group with a structure represented by the following formula (2):

(2)

where $R^1$, $R^2$, $R^3$, and $R^4$ each independently represent a hydrogen atom or an alkyl group having 1 to 2 carbon atoms and optionally containing a hydroxyl group, $$CH_2=CR^5-COO-(CH_2CH_2O)_q-H \qquad (3)$$

where $R^5$ represents a hydrogen atom or a methyl group, and q represents an average number of moles of an ethyleneoxy group added and is 2 to 120.

* * * * *